United States Patent
Macnamara

(10) Patent No.: US 11,822,102 B2
(45) Date of Patent: *Nov. 21, 2023

(54) THREE DIMENSIONAL VIRTUAL AND AUGMENTED REALITY DISPLAY SYSTEM

(71) Applicant: Magic Leap, Inc.

(72) Inventor: John Graham Macnamara, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,902

(22) Filed: Aug. 2, 2022

(65) Prior Publication Data

US 2023/0004018 A1 Jan. 5, 2023

Related U.S. Application Data

(63) Continuation of application No. 16/844,464, filed on Apr. 9, 2020, now Pat. No. 11,474,371, which is a (Continued)

(51) Int. Cl.
*G02B 30/24* (2020.01)
*G03B 21/00* (2006.01)
(Continued)

(52) U.S. Cl.
CPC ........... *G02B 30/24* (2020.01); *G02B 5/1876* (2013.01); *G02B 27/0101* (2013.01); (Continued)

(58) Field of Classification Search
CPC ........ G02B 30/24; G02B 30/52; G02B 30/34; G02B 5/1876; G02B 5/1828;
(Continued)

(56) References Cited

U.S. PATENT DOCUMENTS 5,572,343 A 11/1996 Toshiro
6,407,724 B2 6/2002 Waldern et al.
(Continued)

FOREIGN PATENT DOCUMENTS

CN 101029968 A 9/2008
CN 101750738 A 6/2010
(Continued)

OTHER PUBLICATIONS

"Communication Pursuant to Article 94(3) EPC dated Jul. 21, 2020", European Patent Application No. 19154686.0, (5 pages).
(Continued)

*Primary Examiner* — Wyatt A Stoffa
*Assistant Examiner* — Mitchell T Oestreich
(74) *Attorney, Agent, or Firm* — Stephen M. De Klerk

(57) ABSTRACT

A system may comprise a selectively transparent projection device for projecting an image toward an eye of a viewer from a projection device position in space relative to the eye of the viewer, the projection device being capable of assuming a substantially transparent state when no image is projected; an occlusion mask device coupled to the projection device and configured to selectively block light traveling toward the eye from one or more positions opposite of the projection device from the eye of the viewer in an occluding pattern correlated with the image projected by the projection device; and a zone plate diffraction patterning device interposed between the eye of the viewer and the projection device and configured to cause light from the projection device to pass through a diffraction pattern having a selectable geometry as it travels to the eye.

20 Claims, 13 Drawing Sheets

Related U.S. Application Data continuation of application No. 16/511,488, filed on Jul. 15, 2019, now Pat. No. 10,670,881, which is a continuation of application No. 16/183,619, filed on Nov. 7, 2018, now Pat. No. 10,444,527, which is a continuation of application No. 15/286,695, filed on Oct. 6, 2016, now Pat. No. 10,191,294, which is a continuation of application No. 14/591,543, filed on Jan. 7, 2015, now abandoned, which is a continuation of application No. 13/684,489, filed on Nov. 23, 2012, now Pat. No. 8,950,867.

(60) Provisional application No. 61/563,403, filed on Nov. 23, 2011.

(51) Int. Cl.
| | |
|---|---|
| *G02B 30/34* | (2020.01) |
| *G02B 30/52* | (2020.01) |
| *G02B 27/01* | (2006.01) |
| *G02B 5/18* | (2006.01) |
| *G03B 35/18* | (2021.01) |
| *G03B 35/08* | (2021.01) |

(52) U.S. Cl.
CPC ............. *G02B 30/34* (2020.01); *G02B 30/52* (2020.01); *G03B 21/00* (2013.01); *G03B 35/08* (2013.01); *G02B 5/1828* (2013.01); *G02B 2027/0134* (2013.01)

(58) Field of Classification Search
CPC ........ G02B 27/0101; G02B 2027/0134; G03B 21/00; G03B 35/18
USPC ........................................................ 359/477
See application file for complete search history.

(56) References Cited

U.S. PATENT DOCUMENTS

| | | |
|---|---|---|
| 6,456,438 B1 | 9/2002 | Lee et al. |
| 6,546,438 B1 | 4/2003 | Katsetos et al. |
| 8,570,243 B2 | 10/2013 | Mukawa |
| 8,736,636 B2 | 5/2014 | Kang |
| 8,793,770 B2 | 7/2014 | Lim |
| 8,823,855 B2 | 9/2014 | Hwang |
| 8,874,673 B2 | 10/2014 | Kim |
| 2004/0010923 A1 | 1/2004 | Guiver et al. |
| 2004/0108971 A1 | 6/2004 | Waldern et al. |
| 2004/0109234 A1 | 6/2004 | Levola |
| 2009/0005204 A1 | 2/2009 | Suzuki et al. |
| 2009/0018019 A1 | 7/2009 | Yamaguchi et al. |
| 2010/0001136 A1 | 5/2010 | Arakawa |
| 2010/0011036 A1 | 5/2010 | Chaum |
| 2010/0149611 A1 | 6/2010 | Leister |
| 2010/0157433 A1 | 6/2010 | Mukawa |
| 2011/0021366 A1 | 9/2011 | Osterhout et al. |

FOREIGN PATENT DOCUMENTS

| | | | |
|---|---|---|---|
| CN | 101688977 B | | 12/2011 |
| EP | 0785457 A2 | | 7/1997 |
| JP | H5-093895 A | | 4/1993 |
| JP | H5-36327 A | | 5/1993 |
| JP | H5-328260 A | | 12/1993 |
| JP | 08-160340 A | | 6/1996 |
| JP | 09-297282 A | | 11/1997 |
| JP | H09-297282 A | | 11/1997 |
| JP | 2000-171750 A | | 6/2000 |
| JP | 2010-145859 A | | 7/2010 |
| KR | 10-2001-0014282 A | | 2/2001 |
| RU | 2359297 C1 | | 6/2009 |
| WO | 2008148927 A1 | | 12/2008 |
| WO | 2010/067117 A1 | | 6/2010 |

OTHER PUBLICATIONS

"Communication Pursuant to Article 94(3) EPC dated Sep. 1, 2017", European Patent Application No. 12858115.7.3, (6 pages).
"Decision of Grant of a Patent for Invention (with English Translation) dated Mar. 30, 2017", Russian Patent Application No. 2014125226/08, (15 pages).
"Examination Report No. 1 dated Jun. 5, 2017", Australian Patent Application No. 2012341069, (3 pages).
"Extended European Search Report dated Apr. 15, 2019", European Patent Application No. 19154686.0, (10 pages).
"Extended European Search Report dated Jun. 17, 2022", European Patent Application No. 22163415.7, (11 pages).
"Final Office Action dated Jul. 27, 2017", Japanese Patent Application No. 2014-543465 (with English translation), (19 pages).
"Final Office Action dated May 10, 2018", U.S. Appl. No. 15/286,695, (13 pages.
"First Examination Report dated Sep. 27, 2019", Australian Patent Application No. 2018203315, (3 pages).
"First Examination Report dated Jul. 29, 2019", Australian Patent Application No. 2018203318, (3 pages).
"First Office Action dated Aug. 30, 2019 with English Translation", Chinese Patent Application No. 201710904801.4, (11 pages).
"First Office ActiOn dated Jul. 8, 2019 with English translation", Korean Application No. 10-2014-7017217, (13 pages).
"International Patent Application No. PCT/US12/00560 filed on Nov. 23, 2012", International Search Report and Written Opinion dated Mar. 7, 2013, 7 pages.
"Non Final Office Action dated Sep. 21, 2020", U.S. Appl. No. 16/844,464, (26 pages).
"Notice of Reasons for Rejection dated May 28, 2019 with English translation", Japanese Patent Application No. 2018-127444, (7 pages).
"Office Action dated Aug. 10, 2016", Japanese Patent Application No. 2014-543465 (with English Translation), (17 pages).
"Office Action dated Jul. 9, 2018", Canadian Patent Application No. 2858208, (3 pages).
"Office Action dated Jul. 10, 2019 with English translation", Korean Application No. 10-2017-7030366, (18 pages).
"Second Examination Report dated Apr. 28, 2020", Australian Patent Application No. 2018203315, (4 pages).
"Second Office Action dated Apr. 29, 2020 with English Translation", Chinese Patent Application No. 201710904801.4, (12 pages).
"Second Office Action dated Dec. 16, 2019 (with English translation)", Korean Application No. 10-2014-7017217, (6 pages).
Cakmakci , et al., ""Head-Worn Displays: A Review"", Journal of Display Technology, vol. 2, No. 3, Sep. 2006, Retrieved online on Feb. 1, 2013 at: <http://www.creol.uctedu/Research/Publications/1406.PDF>.
"First Examination Report dated Mar. 21, 2023", Australian Patent Application No. 2022202379, (2 pages).

THREE DIMENSIONAL VIRTUAL AND AUGMENTED REALITY DISPLAY SYSTEM

RELATED APPLICATION DATA

The present application is a continuation application of U.S. patent application Ser. No. 16/844,464, filed on Apr. 9, 2020, which is a continuation of U.S. patent application Ser. No. 16/511,488, filed on Jul. 15, 2019 now U.S. Pat. No. 10,670,881, which is a continuation application of U.S. patent application Ser. No. 16/183,619 filed on Nov. 7, 2018, now U.S. patent Ser. No. 10/444,527, which is a continuation application of Ser. No. 15/286,695 filed on Oct. 6, 2016, now U.S. Pat. No. 10,191,294, which is a continuation application of U.S. patent application Ser. No. 14/591,543 filed on Jan. 7, 2015 now abandoned, which is continuation of U.S. patent application Ser. No. 13/684,489 filed on Nov. 23, 2012 now U.S. Pat. No. 8,950,867, which claims the benefit under 35 U.S.C. § 119 to U.S. Provisional Application Ser. No. 61/563,403 filed Nov. 23, 2011. The foregoing applications are hereby incorporated by reference into the present application in their entirety.

FIELD OF THE INVENTION

The present invention relates to virtual reality and augmented reality imaging and visualization systems.

BACKGROUND

In order for a 3D display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth. Referring to FIG. 1, an augmented reality scenario (8) is depicted with views to the user of actual objects within the user's reality, such as landscaping items including a concrete stage object (1120) in a park setting, and also views of virtual objects added into the view to produce the "augmented" reality view; here a robot statue (1110) is shown virtually standing upon the stage object (1120), and a bee character (2) is shown flying in the airspace near the user's head. Preferably the augmented reality system is 3-D capable, in which case it provides the user with the perception that the statue (1110) is standing on the stage (1120), and that the bee character (2) is flying close to the user's head. This perception may be greatly enhanced by utilizing visual accommodation cues to the user's eye and brain that the virtual objects (2, 1110) have different depths of focus, and that the depth of focus or focal radii for the robot statue (1110) is approximately the same as that for the stage (1120). Conventional stereoscopic 3-D simulation display systems, such as that depicted in FIG. 2, typically have two displays (74, 76), one for each eye, at a fixed radial focal distance (10). As stated above, this conventional technology misses many of the valuable cues utilized by the human eye and brain to detect and interpret depth in three dimensions, including the accommodation cue, which is associated with the eye's repositioning of the crystalline lens within the eye complex to reach a different depth of focus with the eye.

There is a need for an accommodation accurate display system which takes into account the accommodation aspects of the human eye/brain image processing complex.

SUMMARY

One embodiment is directed to a three-dimensional image visualization system, comprising a selectively transparent projection device for projecting an image toward an eye of a viewer from a projection device position in space relative to the eye of the viewer, the projection device being capable of assuming a substantially transparent state when no image is projected; an occlusion mask device coupled to the projection device and configured to selectively block light traveling toward the eye from one or more positions opposite of the projection device from the eye of the viewer in an occluding pattern correlated with the image projected by the projection device; and a zone plate diffraction patterning device interposed between the eye of the viewer and the projection device and configured to cause light from the projection device to pass through a diffraction pattern having a selectable geometry as it travels to the eye and enter the eye with a simulated focal distance from the eye based at least in part upon the selectable geometry of the diffraction pattern. The system further may comprise a controller operatively coupled to the projection device, occlusion mask device, and the zone plate diffraction patterning device and configured to coordinate projection of the image and associated occluding pattern, as well as interposition of the diffraction pattern at the selectable geometry. The controller may comprise a microprocessor. The projection device may comprise a substantially planar transparent digital display substantially occupying a display plane. The display plane may be oriented substantially perpendicularly from a visual axis of the eye of the viewer. The substantially planar transparent digital display may comprise a liquid crystal display. The substantially planar transparent digital display may comprise an organic light emitting diode display. The projection device may be configured to project the image toward the eye in a collimated form such that the depth of focus for the eye of the viewer is an infinite depth of focus. The projection device may comprise a high-speed mini-projector coupled to a substrate-guided delay exit pupil expander device configured to expand the size of the image before delivery to the eye of the viewer. The mini-projector may be mounted substantially perpendicularly to a visual axis of the eye of the viewer, and wherein the substrate-guided delay exit pupil expander device is configured to receive the image from the mini-projector and deliver it to the zone plate diffraction patterning device and to the eye of the viewer in the expanded size with an orientation substantially aligned with the visual axis of the eye. The zone plate diffraction patterning device and projection device may comprise at least one common structure. The zone plate diffraction patterning device may be integrated into a waveguide, such that the projection device comprises a high-speed mini-projector coupled to the waveguide and configured pass the image through the diffraction pattern before the image exits the waveguide en route to the eye of the viewer. The mini-projector may be mounted substantially perpendicularly to a visual axis of the eye of the viewer, and the waveguide may be configured to receive the image from the mini-projector and deliver it to the eye of the viewer in an expanded size with an orientation substantially aligned with the visual axis of the eye. The occlusion mask device my comprise a display configured to either occlude or pass light at each of a plurality of portions of the display, depending upon a pertinent command to occlude or pass light at each portion. The occlusion mask device may comprise one or more liquid crystal displays. The zone plate diffraction patterning device may comprise a high-frequency binary display configured to either occlude or pass light at each of a plurality of portions of the display, depending upon a pertinent command to occlude or pass light at each portion. The zone plate diffraction patterning device may have a refresh rate of between about 500 Hz and about 2,000 Hz. The zone plate diffraction patterning device may have a refresh rate of about 720 Hz. The controller may be configured to operate the projection device and occlusion mask device at between about 30 and about 60 frames per second, and to operate the zone plate diffraction patterning device to digitally display up to about 12 different diffraction patterns for each frame of the projection device and occlusion mask device. The projection device, occlusion mask device, and the zone plate diffraction patterning device collectively may comprise an imaging module for a single eye of the viewer, and the system further may comprise a second imaging module for another eye of the viewer.

DETAILED DESCRIPTION

Figure 1:
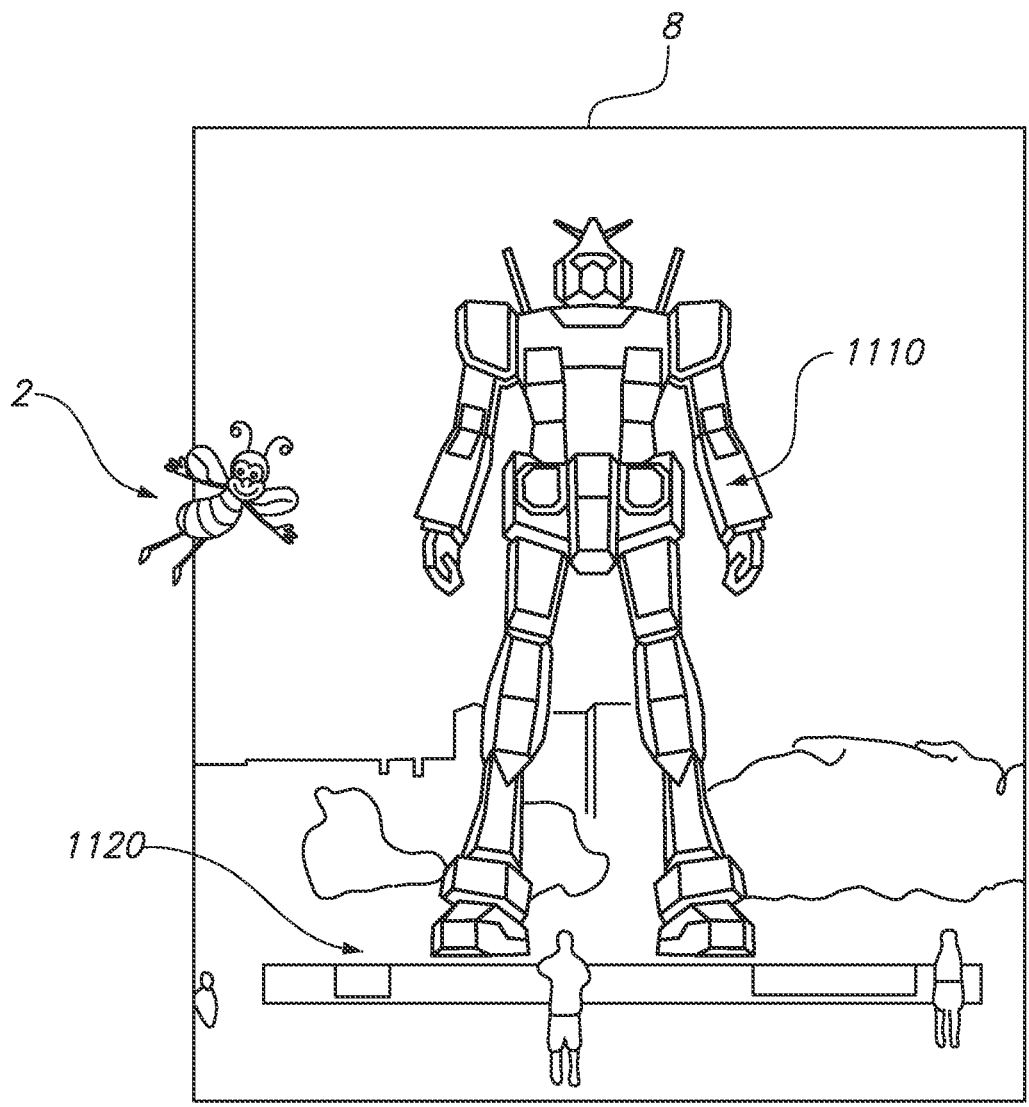
FIG. 1 depicts an illustration of an augmented reality scenario with certain virtual reality objects, and certain actual reality objects viewed by a person.
Figure 2:
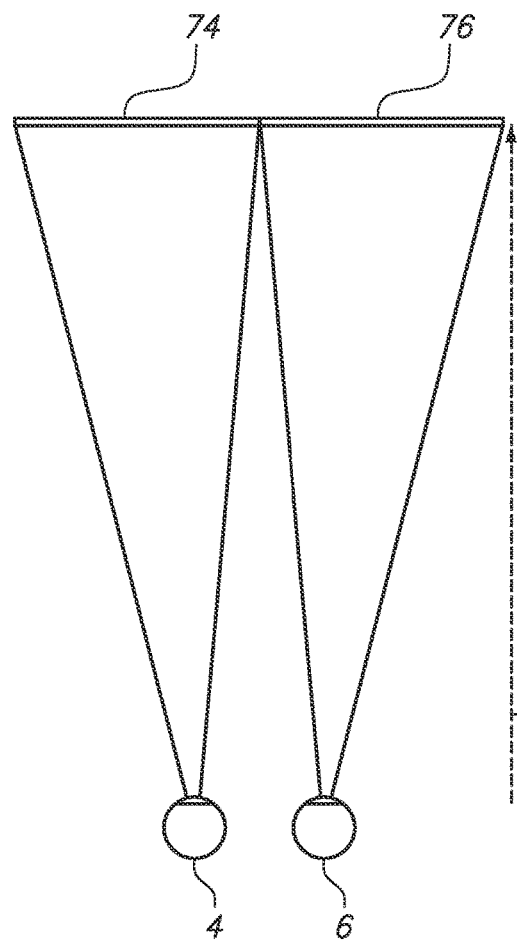
FIG. 2 illustrates a conventional stereoscopy system to simulate three-dimensional imaging for the user.
Figure 3A:
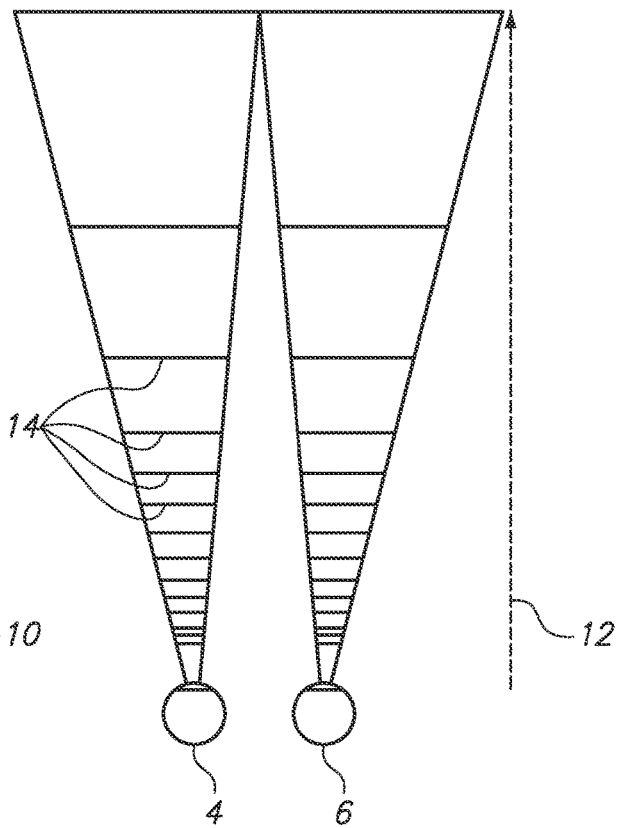
FIGS. 3A and 3B illustrate aspects of an accommodation accurate display configuration.
Figure 3B:
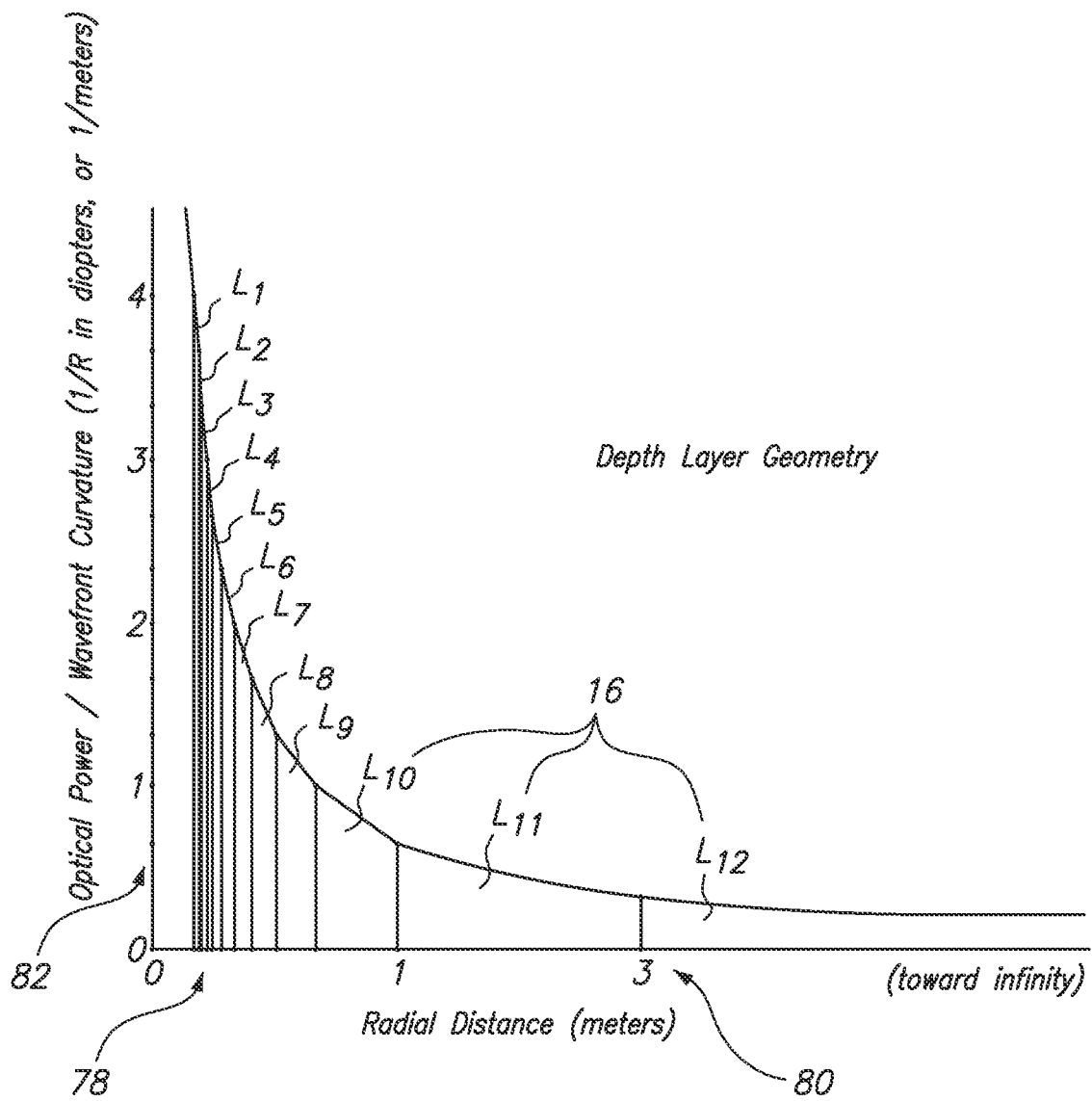

Referring to FIGS. 3A and 3B, various aspects of an AAD system are depicted. Referring to FIG. 3A, a simple illustration shows that in the place of two conventional displays as in stereoscopy (FIG. 2), two complex images, one for each eye, with various radial focal depths (12) for various aspects (14) of each image may be utilized to provide each eye with the perception of three dimensional depth layering within the perceived image.

Referring to FIG. 3B, we have determined that the typical human eye is able to interpret approximately 12 layers (layers L1-L12 in FIG. 3B—drawing element 16) of depth based upon radial distance. A near field limit (78) of about 0.25 meters is about the closest depth of focus; a far-field limit (80) of about 3 meters means that any item farther than about 3 meters from the human eye receives infinite focus. The layers of focus get more and more thin as one gets closer to the eye; in other words, the eye is able to perceive differences in focal distance that are quite small relatively close to the eye, and this effect dissipates as objects fall farther away from the eye, as shown in FIG. 3B. Element 82 illustrates that at an infinite object location, a depth of focus/dioptric spacing value is about ⅓ diopters. One other way of describing the import of FIG. 3B: there are about twelve focal planes between the eye of the user and infinity. These focal planes, and the data within the depicted relationships, may be utilized to position virtual elements within an augmented reality scenario for a user's viewing, because the human eye is constantly sweeping around to utilize the focal planes to perceive depth.

Figure 4A:
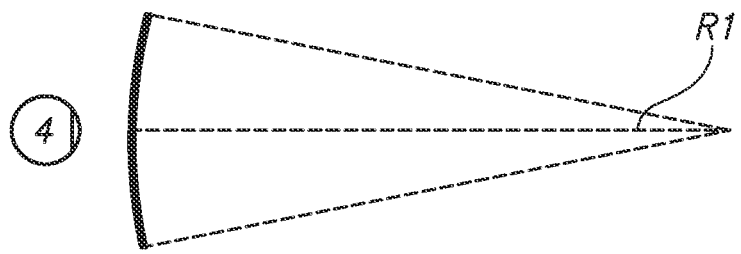
FIGS. 4A-4C illustrate relationships between radius of curvature and focal radius.
Figure 4B:
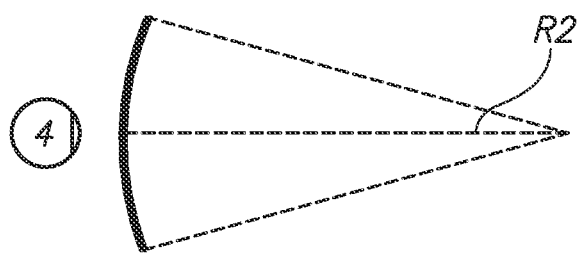
Figure 4C:
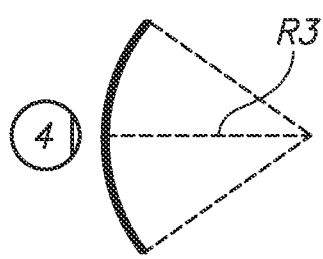

Referring to FIGS. 4A-4C, if K(R) is a dynamic parameter for curvature equal to 1/R, where R is the focal radius of an item relative to a surface, then with increasing radius (R3, to R2, up to R1), you have decreasing K(R). The light field produced by a point has a spherical curvature, which is a function of how far away the point is from the eye of the user. This relationship may also be utilized for AAD systems.

Figure 5:
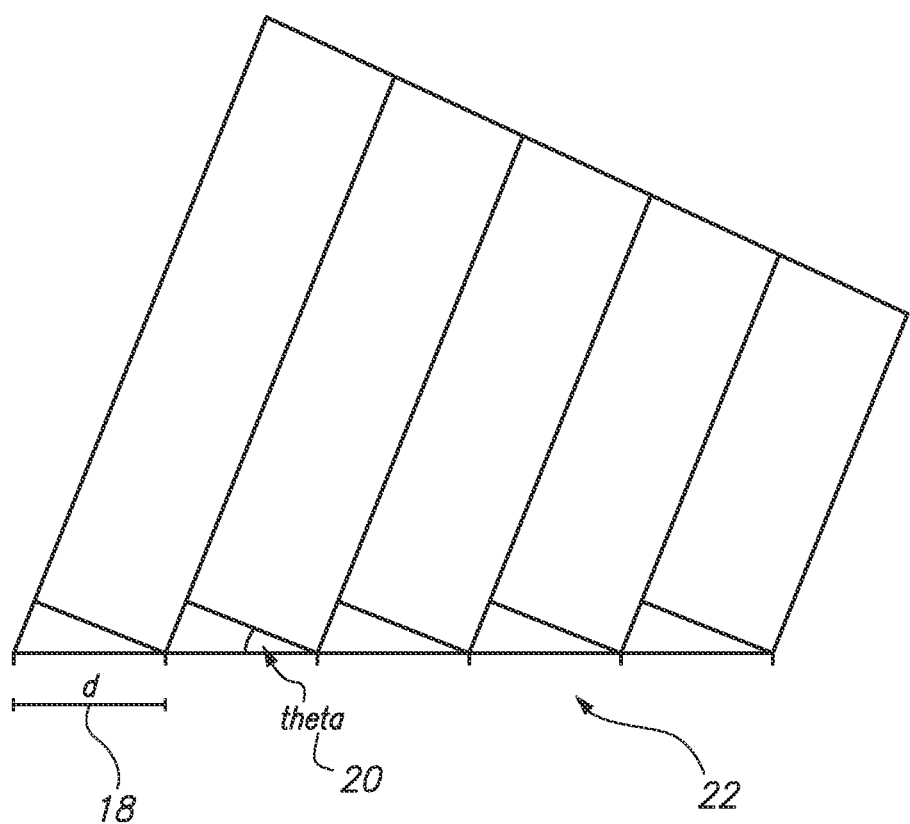
FIGS. 5, 6A, 6B and 6C illustrate aspects of diffraction gratings as applied to the subject configurations.
Figure 6A:
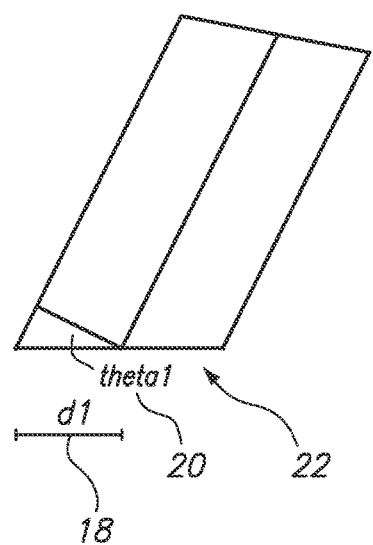
Figure 6B:
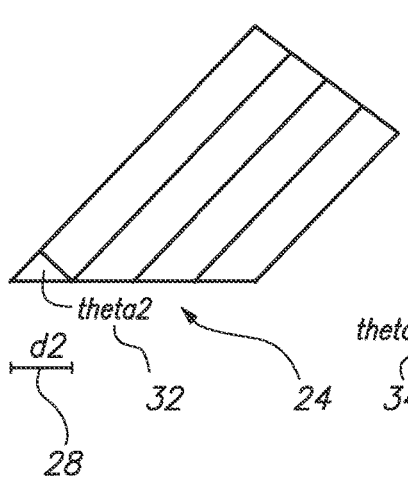
Figure 6C:
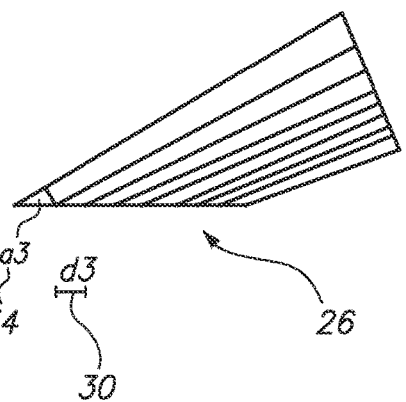

Referring to FIG. 5, a conventional diffraction grating (22) is shown, with light passing through the grating spacing (18) at an angle (theta−20) which is related to the diffraction order (n), spatial frequency, and K factor, which equals 1/d, using the following equation: d*sin(theta)=n*wavelength (or alternatively substituting the K factor, sin(theta)=n*wavelength*K. FIGS. 6A-6C illustrate that with decreased spacing (18, 28, 30) in the diffraction pattern (22, 24, 26), the angle (20, 32, 34) becomes greater.

Figure 7A:
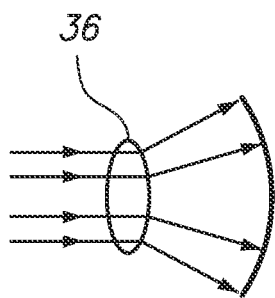
FIGS. 7A-7C illustrate three different focal mechanisms.
Figure 7B:
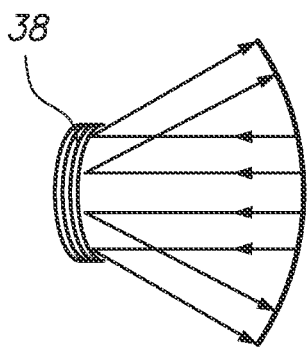
Figure 7C:
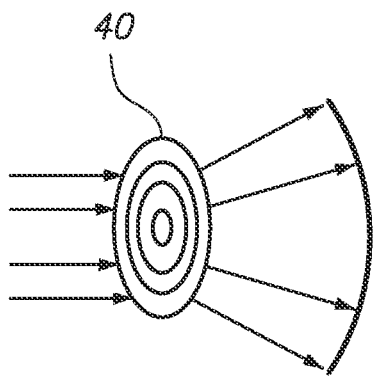
Figure 7D:
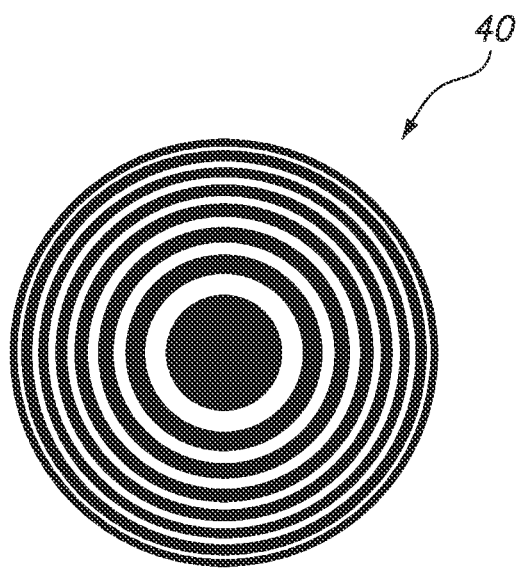
FIG. 7D illustrates a Fresnel zone plate.

Referring to FIGS. 7A-7C, three different focusing mechanisms are depicted—refraction through a lens (36), reflection with a curved mirror (38), and diffraction with a Fresnel zone plate (40), also shown in FIG. 7D (40).

Figure 8A:
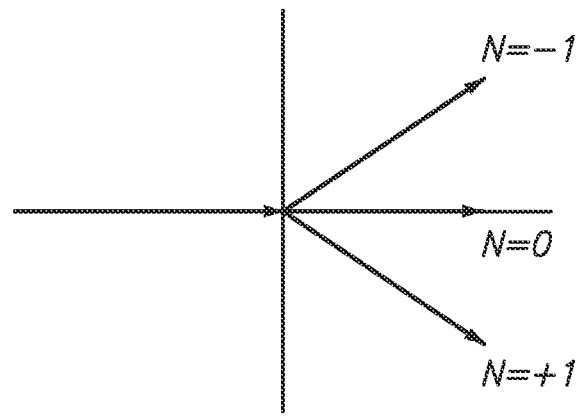
FIGS. 8A-8C illustrate various aspects of diffraction system focusing issues.
Figure 8B:
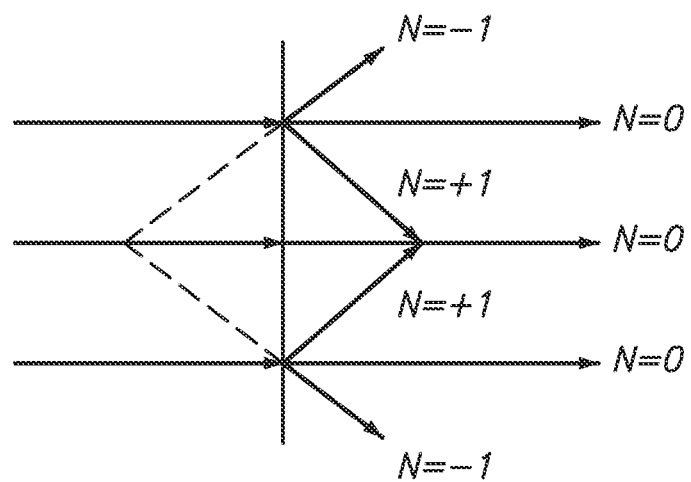
Figure 8C:
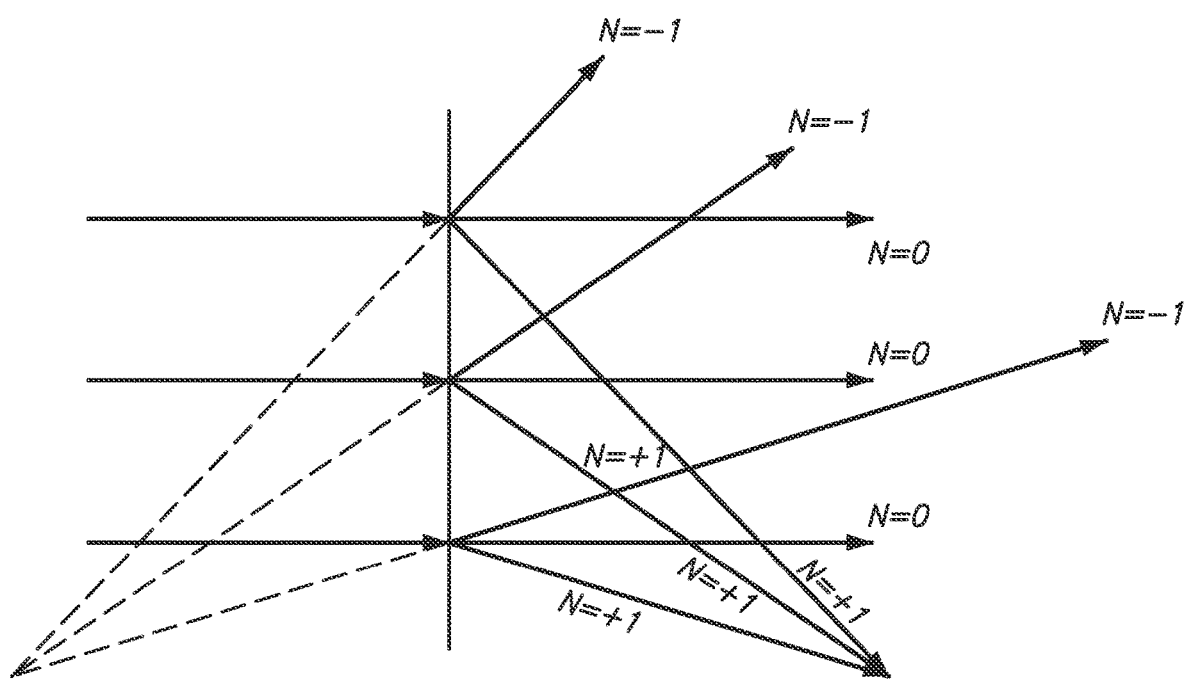

Referring to FIG. 8A, a simplified version of diffraction is shown to illustrate that an N=−1 mode could correspond to a virtual image; an N=+1 mode could correspond to a real image, and an N=0 mode could correspond to a focused-at-infinity image. These images could be confusing to the human eye and brain, and particularly problematic if all focused on-axis, as shown in FIG. 8B. Referring to FIG. 8C, an off-axis focus configuration may be utilized to allow for blocking of modes/images that are unwanted. For example, a collimated (r=infinity) image may be formed by the N=0 mode; a divergent virtual image may be formed by the N=−1 mode; and a convergent image may be formed by the N=+1 mode. The difference in spatial location of these modes/images and their trajectories allows for filtering out or separation to prevent the aforementioned problems associated with diffraction imaging, such as overlaying, ghosting, and "multiple exposure" perception effects.

Figure 9:
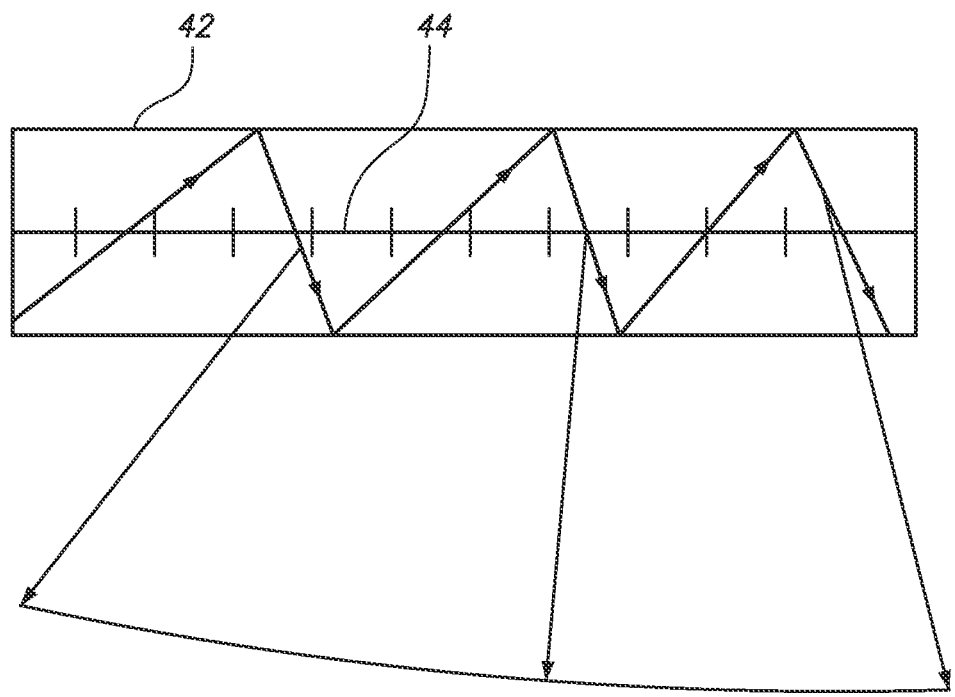
FIG. 9 illustrates one embodiment of a waveguide with embedded diffraction grating.
Figure 10:
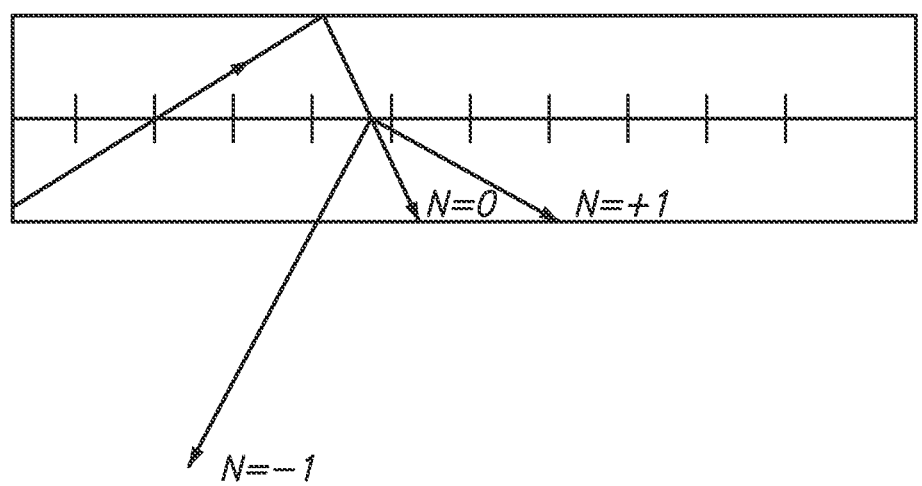
FIG. 10 illustrates one embodiment of a waveguide with embedded diffraction grating designed to allow one mode to escape and the other modes to remain trapped in the waveguide.

Referring to FIG. 9, a waveguide is shown having an embedded diffraction grating; such waveguides are available, for example, from suppliers such as BAE Systems PLC of London, U.K. and may be utilized to intake an image from the left of FIG. 9 as shown, pass the image through the embedded diffraction grating (44), and pass the resultant image out at an angle (in FIG. 9, for example, through the side of the waveguide). Thus a dual use of redirection and diffraction may be achieved with such an element. Indeed, off-axis focal techniques, such as those described in reference to FIG. 8C, may be combined with diffraction waveguide elements such as that shown in FIG. 9 to result in a configuration such as that shown in FIG. 10, wherein not only are redirection and diffraction accomplished, but also filtering, since in the depicted embodiment the geometry of the diffracting waveguide is such that the N=−1 mode (say the virtual image) is passed out of the waveguide and into the eye of the user, and the other two modes (N=0 and N=+1) are trapped inside of the waveguide by reflection.

Referring to FIGS. 11A-13C, the aforementioned concepts are put into play with various augmented reality display configurations.

Figures 11A, 11B:
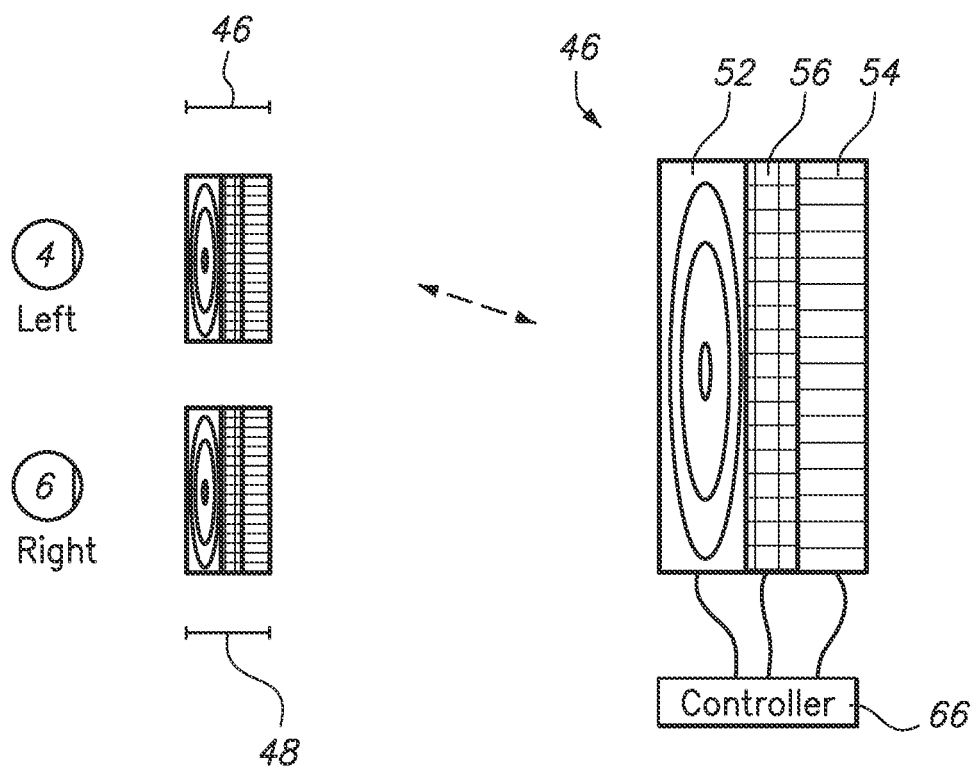
FIGS. 11A-11B illustrate aspects of a diffractive imaging module embodiment.

Referring to FIG. 11A, an AAD system comprises an imaging module (46, 48) in front of each eye (4, 6) through which the user sees the world. FIG. 11B illustrates a larger view of the module (46) with its associated (coupled via the depicted electronic control leads; leads may also be wireless) controller (66), which may be a microprocessor, microcontroller, field programmable gate array (FPGA), application specific integrated circuit (ASIC), or the like. The controller preferably is coupled to a power supply and also an information exchange device, such as a wireless internet or Bluetooth adaptor, to allow for the exchange of information between the outside world and the controller (66). The system may be configured to operate at an image refresh rate, such as a rate between 30 and 60 frames per second. The controller may be configured to operate a high-refresh rate digital high resolution display (52), such as a ferro-liquid, bluephase, or bent-core display, to display various zone plate geometries quickly in succession, pertinent to each of the 12 or so depth layers. For example, in an embodiment wherein 60 frames per second overall performance is desired, the zone plate display (52) may be operated at 12 times this, or 720 Hz, to be able to provide simulated accommodation to each of the 12 depth layers as shown in FIG. 3B. The occluding mask display (54) is configured to display a blacked out image geometrically corresponding to the image displayed before it on the transparent projector layer (56)—blacked out to prevent light from the other side of the occluding mask display from bleeding through or interfering with display of a desired virtual or augmented image in the projector layer (56). Thus in an augmented reality configuration, as shown, light from the real background passes through the non-masked portions of the occlusion mask (54), though the transparent (i.e., not broadcasting a portion of an image) portions of the transparent projector layer (56), and into the zone plate layer (52) for accommodation treatment; images projected at the projecting layer (56) receive mask blocking from background light at the occlusion layer (54) and are projected forward into the zone plate layer (52) for accommodation treatment. The combination of these, or the associated perception of the augmented reality to the user, is very close to "true 3-D".

Figures 12A, 12B:
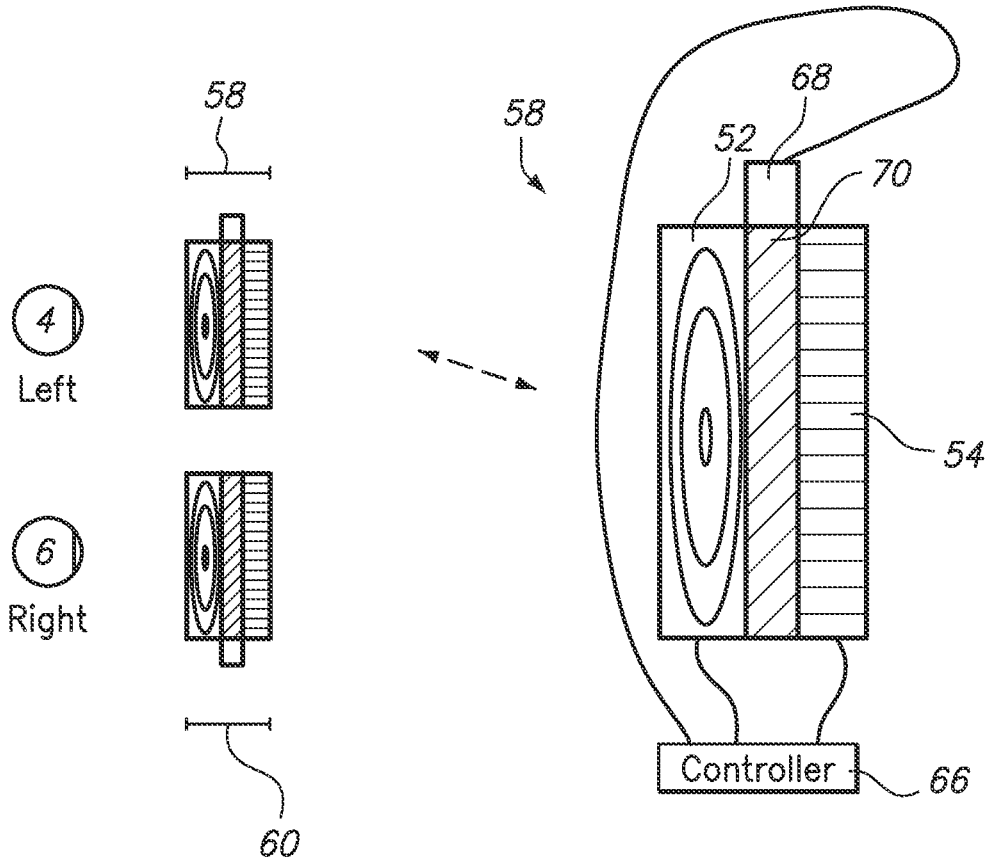
FIGS. 12A-12B illustrate aspects of a diffractive imaging module embodiment.

FIGS. 12A-12B depict another embodiment wherein an imaging module (58) comprises high-resolution mini projector oriented at an angle approximately perpendicular to the visual axis of the eye; a waveguide comprising a substrate guided delay exit pupil expander device (70) magnifies and redirects the image from the small mini projector and into the zone plate layer (52); the occluding layer (54) provides similar masking functions to protect perception of the projected images from background lighting.

Figures 13A, 13B:
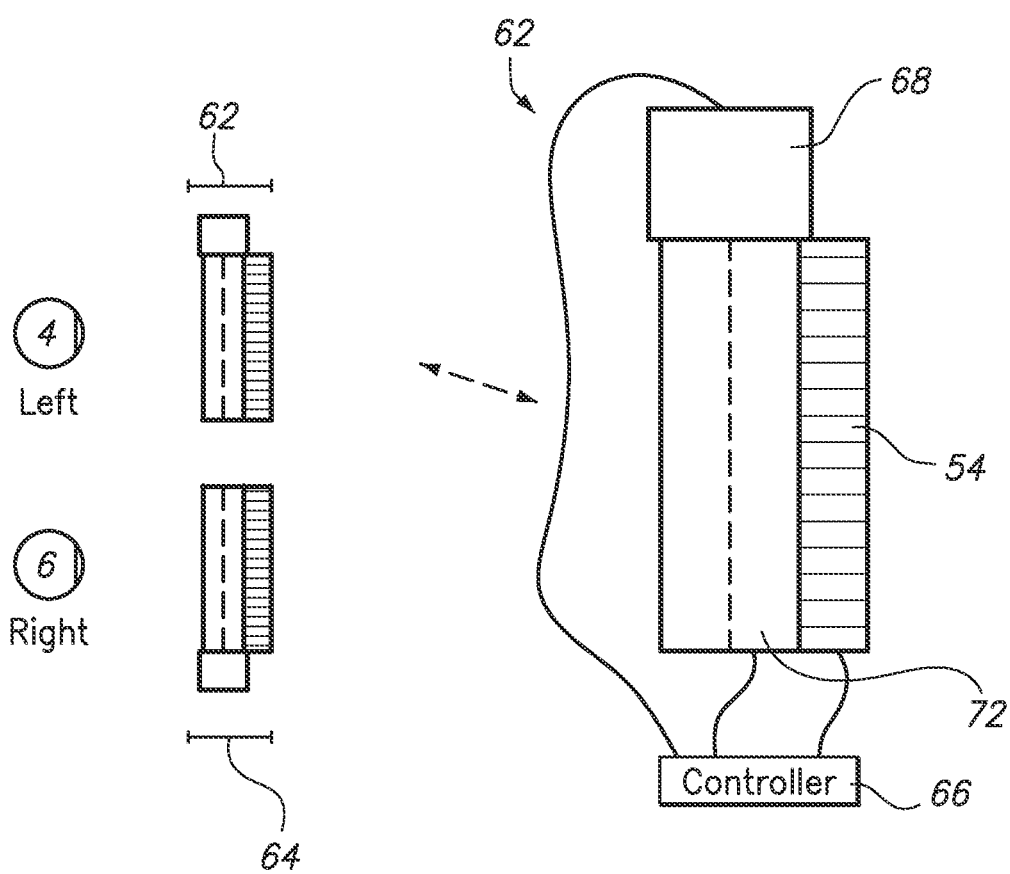
FIGS. 13A-13B illustrate aspects of a diffractive imaging module embodiment.

FIGS. 13A-13B depict another embodiment elements 52 and 70 are combined such that the zone plate and projecting layer are essentially housed within the same integrated module (72) which intakes a small image from the mini projector (68), redirects and magnifies it, and also diffracts it, for passage to the eye; the occluding layer (54) provides similar masking functions to protect perception of the projected images from background lighting.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed:

1. A method of presenting a three-dimensional image to a viewer with a three-dimensional image visualization system, the method comprising:
   projecting an image from a selectively transparent projection device through a selectively transparent zone plate diffraction patterning device having a selectable geometry to apply an accommodation treatment to the image, wherein the selectively transparent zone plate diffraction patterning device is interposed between an eye of the viewer and the selectively transparent projection device;
   operating a selectively transparent occlusion mask device to selectively block background light from entering the eye of the viewer, wherein the background light travels on an axis that runs through the selectively transparent occlusion mask device and the selectively transparent projection device toward the eye from one or more positions opposite of the selectively transparent projection device from the eye of the viewer; and
   delivering a modified image to the eye of the viewer.

2. The method of claim 1, wherein the operating the selectively transparent occlusion mask device to selectively block background light comprises creating an occluded region on at least one portion of the selectively transparent occlusion mask device.

3. The method of claim 2, further comprising correlating the occluded region with the image projected from the selectively transparent projection device.

4. The method of claim 3, wherein the correlating comprises selectively controlling the occluded region to geometrically align with the image projected from the selectively transparent projection device.

5. The method of claim 1, further comprising displaying a selectable diffraction geometry on at least a portion of the selectively transparent zone plate diffraction patterning device.

6. The method of claim 5, wherein the applying the accommodation treatment further comprises passing the image projected from the selectively transparent projection device through the selectable diffraction geometry.

7. The method of claim 5, further comprising correlating the image projected from the selectively transparent projection device with the displayed selectable diffraction geometry.

8. The method of claim 7, wherein the correlating comprises controlling the selectable diffraction geometry on at least a portion of the selectively transparent zone plate diffraction patterning device to geometrically align with the image projected from the selectively transparent projection device.

9. The method of claim 5, wherein applying an accommodation treatment to the image further comprises modifying a focal distance of the image projected from the selectively transparent projection device using the selectable diffraction geometry.

10. The method of claim 1, wherein projecting the image from a selectively transparent projection device further comprises redirecting light toward the eye of the viewer.

11. The method of claim 10, wherein redirecting light toward the eye of the viewer further comprises:
    accepting light into a waveguide at a first angle; and
    outputting light at a second angle.

12. The method of claim 1, wherein applying an accommodation treatment comprises displaying a series of selectable diffraction geometries on at least a portion of a selectively transparent zone plate diffraction patterning device at a selected frequency.

13. The method of claim 12, wherein the selected frequency is 720 Hz.

14. The method of claim 1, wherein selectively blocking background light from entering an eye of the viewer further comprises displaying a blacked out image on the selectively transparent occlusion mask device, the blacked out image geometrically correlating to the image projected from the selectively transparent projection device.

15. The method of claim 1, further comprising emitting an initial image from an imaging module.

16. The method of claim 15, further comprising transmitting the initial image from the imaging module to the selectively transparent projection device.

17. The method of claim 16, further comprising receiving the initial image from the imaging module into the selectively transparent projection device.

18. The method of claim 17, wherein transmitting the initial image from the imaging module to the selectively transparent projection device includes magnifying and diffracting the initial image.

19. The method of claim 18, wherein transmitting the initial image further comprises directing the initial image toward the selectively transparent projection device on an initial image trajectory substantially perpendicular to a modified image trajectory of the modified image traveling to the eye of the viewer.

20. The method of claim 1, wherein delivering the modified image to the eye of the viewer comprises delivering an image having eye accommodation cues to the eye of the viewer.

* * * * *